(12) United States Patent
Guzik et al.

(10) Patent No.: US 12,423,999 B2
(45) Date of Patent: Sep. 23, 2025

(54) TECHNIQUES FOR IMPROVING AN IMAGE READABILITY USING ONE OR MORE PATTERNS

(71) Applicants: Getac Technology Corporation, Taipei (TW); WHP Workflow Solutions, Inc., North Charleston, SC (US)

(72) Inventors: Thomas Guzik, Edina, MN (US); Muhammad Adeel, Edina, MN (US)

(73) Assignees: Getac Technology Corporation, Taipei (TW); WHP Workflow Solutions, Inc., North Charlesto (SC)

( * ) Notice: Subject to any disclaimer, the term of this patent is extended or adjusted under 35 U.S.C. 154(b) by 547 days.

(21) Appl. No.: 17/353,534

(22) Filed: Jun. 21, 2021

(65) Prior Publication Data
US 2022/0405519 A1 Dec. 22, 2022

(51) Int. Cl.
*G06V 20/62* (2022.01)
*G06K 7/14* (2006.01)
(Continued)

(52) U.S. Cl.
CPC .......... *G06V 20/62* (2022.01); *G06K 7/1413* (2013.01); *G06K 7/1417* (2013.01);
(Continued)

(58) Field of Classification Search
CPC .... G06V 20/62; G06V 10/141; G06V 10/143; G06V 20/40; G06V 10/44; G06V 10/462;
(Continued)

(56) References Cited

U.S. PATENT DOCUMENTS 10,081,314 B2 * 9/2018 Fleming ................ G06V 20/62
10,341,605 B1 * 7/2019 Vanman ............ H04N 21/2343
(Continued)

FOREIGN PATENT DOCUMENTS

JP 2018531474 A 10/2018
KR 1020000000044 A * 1/2000
(Continued)

OTHER PUBLICATIONS

International Patent Application No. PCT/US2022/033117, International Search Report and Written Opinion mailed Oct. 6, 2022, 8 pages.
(Continued)

*Primary Examiner* — Gregory A Morse
*Assistant Examiner* — Stefano Anthony Dardano
(74) *Attorney, Agent, or Firm* — Finnegan, Henderson, Farabow, Garrett & Dunner, L.L.P.

(57) ABSTRACT

Image readability is improved via one or more patterns taken using different light wavelengths. A first pattern may include alphanumeric characters, barcodes, Quick Response (QR) codes, or a similar unique code that can be used to identify vehicle license plates, road signals, charts, placards, advertisements, or the like, using a light wavelength such as a visible light wavelength. A paired second pattern may include a copy of the first pattern or a different pattern but constructed with a different material that responds to a different light wavelength e.g., Ultra-Violet (UV) light wavelength. In one example, the paired second pattern may be identified and used as a reference for identifying the first pattern. This technique of using multi-patterns for identifying road signals, charts, placards, advertisements, and particularly the vehicle license plates during extreme weather conditions may improve law enforcement operations or other similar purposes.

20 Claims, 8 Drawing Sheets

(51) Int. Cl.
  *G06V 10/141* (2022.01)
  *G06V 10/143* (2022.01)
  *G06V 10/44* (2022.01)
  *G06V 10/46* (2022.01)
  *G06V 10/56* (2022.01)
  *G06V 20/40* (2022.01)
  *G06V 20/56* (2022.01)
  *G06V 30/10* (2022.01)

(52) U.S. Cl.
  CPC .......... *G06V 10/141* (2022.01); *G06V 10/143* (2022.01); *G06V 20/40* (2022.01); *G06V 10/44* (2022.01); *G06V 10/462* (2022.01); *G06V 10/56* (2022.01); *G06V 20/56* (2022.01); *G06V 20/625* (2022.01); *G06V 30/10* (2022.01)

(58) Field of Classification Search
  CPC ...... G06V 10/56; G06V 20/56; G06V 20/625; G06V 30/10; G06V 10/25; G06V 20/54; G06V 20/582; G06K 7/1413; G06K 7/1417; G06F 18/213
  See application file for complete search history.

(56) References Cited

U.S. PATENT DOCUMENTS

| | | | |
|---|---|---|---|
| 10,559,200 B1* | 2/2020 | Langley | G06F 1/3296 |
| 10,755,613 B2 | 8/2020 | Brubaker | |
| 10,796,567 B1* | 10/2020 | Tang | G08G 1/207 |
| 10,896,340 B2* | 1/2021 | Johnson | G06V 10/145 |
| 11,412,139 B2* | 8/2022 | Li | H04N 23/11 |
| 2007/0031008 A1 | 2/2007 | Miyahara | |
| 2007/0242153 A1 | 10/2007 | Tang et al. | |
| 2012/0008832 A1 | 1/2012 | Wang et al. | |
| 2012/0260277 A1 | 10/2012 | Kosciewicz | |
| 2014/0160283 A1* | 6/2014 | Hofman | G06V 10/147 |
| | | | 348/143 |
| 2017/0161593 A1 | 6/2017 | Smithson et al. | |
| 2017/0178345 A1 | 6/2017 | Pham | |
| 2018/0025636 A1 | 1/2018 | Boykin et al. | |
| 2018/0060675 A1 | 3/2018 | Ji et al. | |
| 2018/0240221 A1* | 8/2018 | Rijnders | H04N 19/149 |
| 2019/0065879 A1* | 2/2019 | Kim | G06T 7/90 |
| 2020/0334977 A1 | 10/2020 | Tang et al. | |
| 2021/0168288 A1 | 6/2021 | Li et al. | |
| 2021/0312725 A1 | 10/2021 | Milton | |

FOREIGN PATENT DOCUMENTS

| | | |
|---|---|---|
| KR | 101442160 B1 | 9/2014 |
| KR | 20210042591 A | 4/2021 |
| WO | 2017173017 A1 | 10/2017 |

OTHER PUBLICATIONS

International Patent Application No. PCT/US2022/033119, International Search Report and Written Opinion mailed Oct. 11, 2022, 10 pages.
U.S. Appl. No. 17/352,158, Final Office Action mailed Feb. 15, 2023, 34 pages.
U.S. Appl. No. 17/352,158, Office Action mailed Sep. 29, 2022, 36 pages.
U.S. Appl. No. 17/352,158, Notice of Allowance mailed Sep. 7, 2023, 32 pages.
U.S. Appl. No. 17/352,158, Office Action mailed Jun. 29, 2023, 31 pages.

* cited by examiner

TECHNIQUES FOR IMPROVING AN IMAGE READABILITY USING ONE OR MORE PATTERNS

BACKGROUND

Law enforcement agencies provide officers and agents with an assortment of devices—electronic and otherwise—to carry out duties required of a law enforcement officer. Such devices include radios (in-vehicle and portable), body-worn cameras, weapons (guns, Tasers, clubs, etc.), portable computers, and the like. In addition, vehicles such as cars, motorcycles, bicycles, and SEGWAY are typically equipped with electronic devices associated with the vehicle, such as vehicle cameras, sirens, beacon lights, spotlights, personal computers, etc.

It is increasingly common for law enforcement agencies to require officers to activate cameras (body-worn and vehicle-mounted) that enable officers to capture audio and/or video of incidents in which an officer is involved. This provides a way to collect and preserve evidence, that would otherwise be unavailable, for subsequent legal proceedings. This evidence greatly aids in the investigation of criminal activities, identification of perpetrators of crimes, and examination of allegations of police misconduct, to name a few advantages.

It is also desirable in many circumstances such as during extreme weather conditions that the electronic devices are leveraged to capture audio and/or video contents to improve law enforcement functions.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
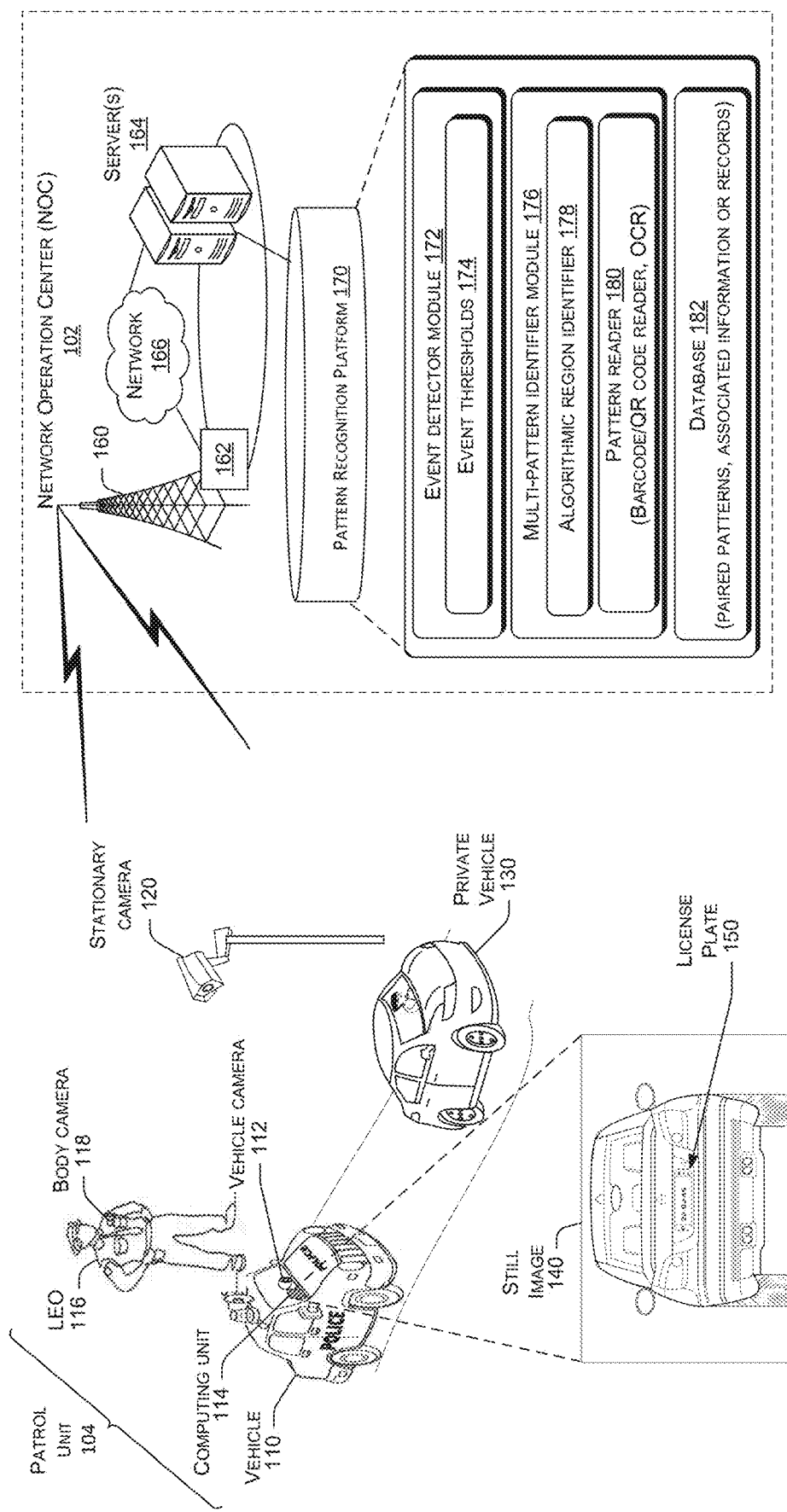
FIG. 1 illustrates an example architecture that implements capturing of still images during video streaming for pattern identifications in accordance with at least one embodiment.

This disclosure is directed to techniques of improving an image readability via one or more patterns (e.g., multi-patterns) that may be taken using different light wavelengths. The one or more patterns may include preconfigured pairs of patterns that can be read using different light wavelengths. A first pattern may include alphanumeric characters, barcodes, Quick Response (QR) codes, a similar unique code, or a combination thereof, that can be used to identify vehicle license plates, road signals, charts, placards, advertisements, or the like. The first pattern may be visible to a naked eye and can be captured using a particular range of light wavelengths such as a (400 nm-700 nm) visible light wavelengths. A paired second pattern may similarly include alphanumeric characters, barcodes, etc. to identify the same vehicle license plates, road signals, charts, placards, advertisements, or the like, but constructed with a different material that responds to a different range of light wavelengths such as (100 nm-400 nm) Ultra-Violet (UV) light wavelengths. The second pattern may be colorless and/or invisible to the naked eye. Given a situation where extreme weather conditions such as heavy snow, rain, or fog may prevent an imaging device from capturing a clear still image to identify the first pattern, then the imaging device may be adjusted to use the different light wavelength to capture the paired second pattern. The paired second pattern may be identified using a barcode reader, QR code reader, and/or optical character recognition (OCR) algorithm. Upon identification of the second pattern, a database may be searched for the corresponding first pattern and associated information. For example, a colorless barcode may be paired with visible alphanumeric characters of a particular vehicle license plate. In this example, upon identification of the colorless barcode using the UV light wavelength, the corresponding alphanumeric characters of the particular vehicle license plate may be retrieved from the database. The retrieved alphanumeric characters of the vehicle license plate including the associated information such as vehicle model, vehicle identification number, or the vehicle registered owner, may be displayed on a user interface or supplied to a law enforcement officer or an agency for further processing. This technique of using patterns for identifying road signals, charts, placards, advertisements, and particularly the vehicle license plates during extreme weather conditions may improve law enforcement operations or other similar purposes. Recognition of a vehicle license plate number on a vehicle license plate is used throughout this description as an example. However, one of skill in the art will appreciate that the techniques described herein may be applied to any suitable code and/or string displayed and/or associated with a surface.

In one example, an imaging device may be installed in a police vehicle to capture and stream video to a network operation center (NOC). The imaging device may include one or more sensors such as a radar, microphone, a light sensor, rain/snow/fog sensor, and/or the like. The NOC may include a server that can remotely manage imaging devices or cameras that can be deployed for law enforcement purposes or other similar applications. In this example, the NOC may receive video streams that can be captured by the imaging device using the visible light wavelength. The NOC may then receive data measurements that can trigger an adjustment in the configuration of the imaging device. The data measurement may indicate an occurrence of an event (e.g., speeding vehicle) that can trigger capturing of still images. Further, the data measurement may indicate the presence of heavy snow, rain, or fog that can generate opaque visibility at the visible light wavelengths. In this regard, the NOC may facilitate an adjustment in the configuration of the imaging device to capture still images using a different range of light wavelengths such as the UV light wavelengths.

With the captured still image in the example above, the NOC may use an algorithm to identify a region-of-interest on the captured still image. In one example, the algorithm may include an edge feature extraction to generate a saliency map of the still image. The saliency map of the still image may include a transformed image in which a brightness of a pixel can represent how salient the pixel is. The saliency map may be sometimes referred to as a heat map where hotness refers to the region-of-interest on the still image that has a big impact on predicting a class to which an object belongs. Upon generation of the saliency map, the region-of-interest may be down-sampled and cropped to enhance the still image. Thereafter, a pattern reader may be trained on the cropped region-of-interest to identify the paired pattern that was taken using the UV light wavelength. In one example, an identified paired pattern may be used as a reference to find the corresponding pattern for the vehicle license plate, traffic signs, advertisements, and/or the like.

As used herein, the terms "device," "portable device," "electronic device," and "portable electronic device" are used to indicate similar items and may be used interchangeably without affecting the meaning of the context in which they are used. Further, although the terms are used herein in relation to devices associated with law enforcement, it is noted that the subject matter described herein may be applied in other contexts as well, such as in a security system that utilizes multiple cameras and other devices.

The implementation and operations described above are ascribed to the use of a server (e.g., a NOC server); however, alternative implementations such as the use of the deployed imaging devices, recording devices that are capable of being worn or mounted to a person, and/or other similar portable devices may execute certain operations in conjunction with or wholly within a different element or component of the system(s). Further, the techniques described herein may be implemented in a number of contexts, and several example implementations and contexts are provided with reference to the following figures. The term "techniques," as used herein, may refer to system(s), method(s), computer-readable instruction(s), module(s)m algorithms, hardware logic, and/ or operation(s) as permitted by the context described above and throughout the document.

Example Architecture

FIG. 1 illustrates a schematic view of an example architecture 100 that implements capturing of still images during video streaming for pattern identifications. The capturing of the still images may utilize a visible light wavelength (or visible light), UV light wavelength (or UV light), or an Infra-Red (IR) light wavelength (or IR light). For example, the visible light may be used to identify a first pattern while the UV light or IR light can be utilized to identify a paired second pattern. An identification of the second pattern may be used as a reference to identify the first pattern, or vice-versa. For example, the first pattern may include actual alphanumeric characters of a vehicle license plate while the paired second pattern can include a barcode or a QR code. In this example, the first pattern may include painted alphanumeric characters that can be captured via the visible light while the second pattern may include a clear coating or ink on a surface of the vehicle license plate that reacts to the UV light. For example, given a situation where an imaging device may not be able to clearly capture the first pattern via the use of visible light due to poor surrounding conditions (e.g., snow conditions), the imaging device may be adjusted to apply the UV light or the IR light to identify the second pattern. Upon identification of the second pattern, the corresponding first pattern and other associated information may be retrieved from a database and displayed on a user interface. Alternatively, or in addition, the clear coating/ink may make the first pattern easier to capture, for example, with sufficient fidelity (e.g., higher resolution, higher image area, better defined edges, better contrast, additional code components) such that conventional OCR techniques have an improved rate of success (e.g., higher accuracy) when processing the captured image. These techniques of using multiple patterns for an automated detection of the vehicle license plate may improve law enforcement operations and other similar purposes.

In one example, during law enforcement operations, a patrol unit may deploy one or more imaging devices or cameras that can stream videos to a Network Operating Center (NOC). The NOC may include a server that can remotely manage configurations of the deployed cameras. In this example, the NOC may monitor an event based on one or more data measurements that can be detected from the streaming videos and/or via one or more sensors in each of the deployed cameras. The event may include an occurrence that can trigger the NOC to adjust the configurations of the deployed cameras. The adjustment in configurations may include capturing a still image using visible light, UV light, or IR light. For example, a detected speeding vehicle may prompt a streaming camera to capture one or more still images of the detected speeding vehicle in addition to the streaming of video. Further, a detected weather condition such as heavy snow may further prompt the use of UV light or IR light to capture the still images. In this example, the capturing of the still images using multiple patterns may enhance image readability as further described in detail below.

The example architecture 100 may include a NOC 102 and an example patrol unit 104 that includes a law enforcement vehicle 110, a vehicle-mounted camera 112, a computing unit 114, and a law enforcement officer (LEO) 116 with a body camera 118. The example architecture 100 further shows a stationary camera 120 installed in a fixed public location, a private vehicle 130 that was pulled over by the patrol unit for illustration purposes, and an example still image 140 (captured by the vehicle camera 112) including a vehicle license plate 150 of the private vehicle 130. The still image 140 may be captured using UV light or IR light in instances where the use of the visible light can be unreliable due to surrounding conditions such as thick fog, heavy rain or snow, pitch darkness, or the like.

The NOC 102 is generally a communication, command, and control system of the base architecture 100. In the present context, the NOC 102 may be part of a law enforcement agency or a facility that can be operated by a third party to offer services to the law enforcement agency. The NOC 102 may be used as a base from which to monitor patrol unit operations, gather and disseminate intelligence information, and control devices under the control of law enforcement officers with which it is in communication. For example, the NOC 102 may deploy cameras for law enforcement operations, receive video streams and/or data measurements from the deployed cameras, processes the data measurements to monitor the occurrence of events, facilitates adjustment in configurations of the deployed cameras, perform pattern identifications, and responds with generated pattern identifications to the patrol units, LEOs, authorized persons after clearance verifications, and/or another agency or system for further processing.

In one example, the NOC 102 may include a transmission tower 160 and a base station 162 that enable communications with the LEO 116, computing unit 114, vehicle camera 112, body camera 118, stationary camera 120, and/or other devices in other patrol units. NOC 102 further includes one or more servers 164 that may receive or transmit data to the patrol unit 104 via a network 166. The network 166 may be a local area network (LAN), a wide-area network (WAN), a carrier or cellular network, or a collection of networks that includes the Internet. Network communication protocols (TCP/IP, 3G, 4G, 5G, etc.) may be used to implement portions of the network 166.

In an embodiment, the one or servers 164 may include a pattern recognition platform 170 that can implement the capturing of still images for pattern recognition such as identifications of patterns associated with the vehicle license plates, traffic signs, placards, advertisements, and/or the like. The pattern recognition platform 170 may include an event detector module 172 with event thresholds 174, a multi-pattern identifier module 176 with an algorithmic region identifier 178 and a pattern reader 180, and a database 182. Each component or module of the pattern recognition platform 170 can be realized in hardware, software, or a combination thereof.

The pattern recognition platform 170 may be configured to include multiple functionalities. One functionality may include the processing of data measurements and video and/or audio data streams from the devices that were deployed for law enforcement purposes. The devices may include vehicle-mounted cameras, stationary cameras, and/or other types of imaging devices that can capture or stream video and/or audio data. For example, the NOC 102 may receive—via the transmission tower 160 and the base station 162—video streams from the vehicle camera 112 during patrol operations. In this example, the pattern recognition platform 170 may process the received video streams by identifying the source of the streaming video and performing pattern identifications as further described in detail below.

Another functionality of the pattern recognition platform 170 may include using the event detector module 172 to detect an occurrence of an event based on one or more data measurements that can be taken by the deployed cameras and/or one or more sensors in each of the deployed cameras. The one or more data measurements may include detected vehicle speed measurements, audio-to-text translations, or revolving high-intensity light measurements at a particular frequency such as when a light bar of the vehicle 110 is activated. Further, the one or more data measurements may include detection of heavy rain, snow, fog, or similar conditions that can generate an opaque image when the still image is captured using the visible light. The one or more sensors in each of the deployed devices may include a radar or speed detector, light sensor, audio sensor, Global Positioning System (GPS), Lidar, gyroscope, thermocouple, motion detector, rain/fog/snow detector, and/or the like.

In an embodiment, the event detector module 172 may compare each of the detected one or more data measurements with a corresponding threshold stored in the event thresholds 174 to determine the occurrence of the event. The event thresholds 174 may store pre-configured values for vehicle speed measurements, text similarity thresholds, light intensity thresholds, similarity in locations, snow conditions, inches of rain, fog conditions, and/or the like. In this embodiment, the event detector module 172 may indicate the occurrence of the event when the at least one data measurement exceeds the corresponding threshold in the event thresholds 174.

For example, the vehicle camera 112 or a vehicle-mounted radar (not shown) detects the speed of the private vehicle 130 to be above a speeding limit. In this example, the computing unit 114, which is in communicative connection with the vehicle camera 112 and the mounted radar, may send this data measurement to the NOC 102 while the vehicle camera 112 is streaming video at the same time. In another example, the camera 112 or rain sensor (not shown) may detect heavy rains or snow that may absorb visible light and generate an opaque image. In these examples, the event detector module 172 may compare the data measurement with the corresponding threshold to determine the presence or occurrence of the event that can trigger the capturing of still images using the UV light or IR light.

In one example embodiment, the occurrence of the event may be used by the pattern recognition platform 170 as a reference for adjusting the configurations of the one or more cameras to capture the desired still images. The adjustment in the configurations may include enhancing the capturing of the images or desired objects in a field of view of the camera. The enhancing may include the capturing of the still images using the visible light, UV light, or the IR light depending upon weather conditions detected by the one or more sensors during the time of capture.

In one example, the multi-pattern identifier module 176 may identify the alphanumeric characters of the license plate 150 of the pulled-over private vehicle 130. As described herein, the alphanumeric characters of the license plate 150 may be paired with another one or more stored patterns for pattern identifications in extreme weather conditions. In this example, the multi-pattern identifier module 176 may initially utilize the algorithmic region identifier 178 to capture an area or region of the still image 140 that includes or most likely to include the license plate 150 as the region-of-interest. Thereafter, the multi-pattern identifier module 176 may use the pattern reader 180 that can read the barcode, QR code, or alphanumeric characters on the region-of-interest of the captured still image.

The algorithmic region identifier 178 may implement an image processing technique that can algorithmically locate one or more regions that appear to be the desired object of interest on the still image 140. In one example, the object of interest on the still image 140 may include the vehicle license plate 150. Vehicle license plates across the different United States may include standard sizes of about 12×6 inches. In addition, these vehicle license plates may be constructed with reflective textures that provide a distinct degree of light intensity when compared to car paint or to a surrounding mounting location, which may be on or above bumper portions of vehicles. In this example, the algorithmic region identifier 178 may use a saliency detection to identify the region that includes or most likely to include the vehicle license plate 150 on the still image 140. The saliency detection may include a pre-processing step in computer vision that aims at finding areas on a particular image that appears to be visually salient as compared to other areas.

Figure 4:
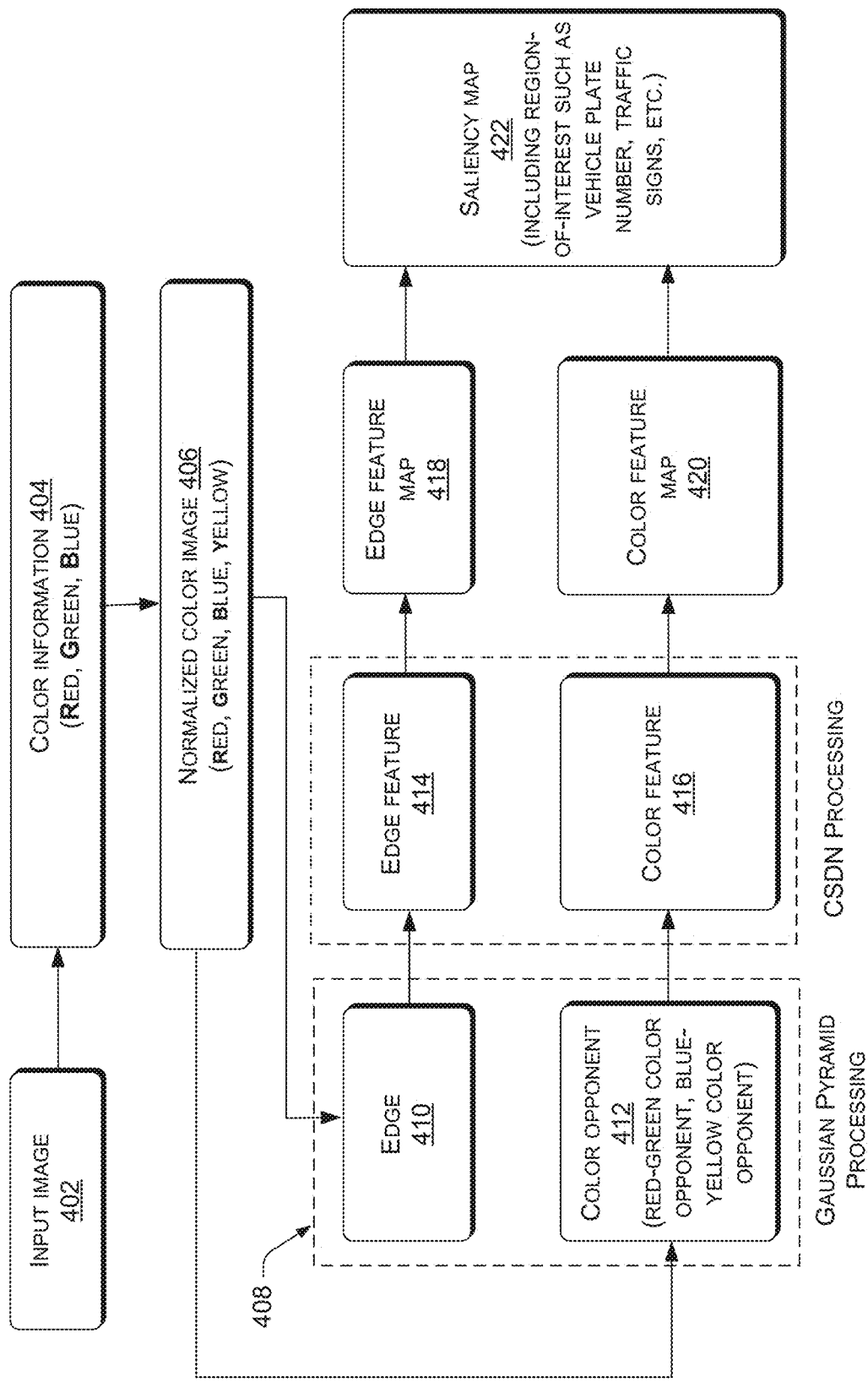
FIG. 4 is a block diagram of pre-processing the still image to generate a saliency map that can be used to identify a region-of-interest in accordance with at least one embodiment.
Figure 5:
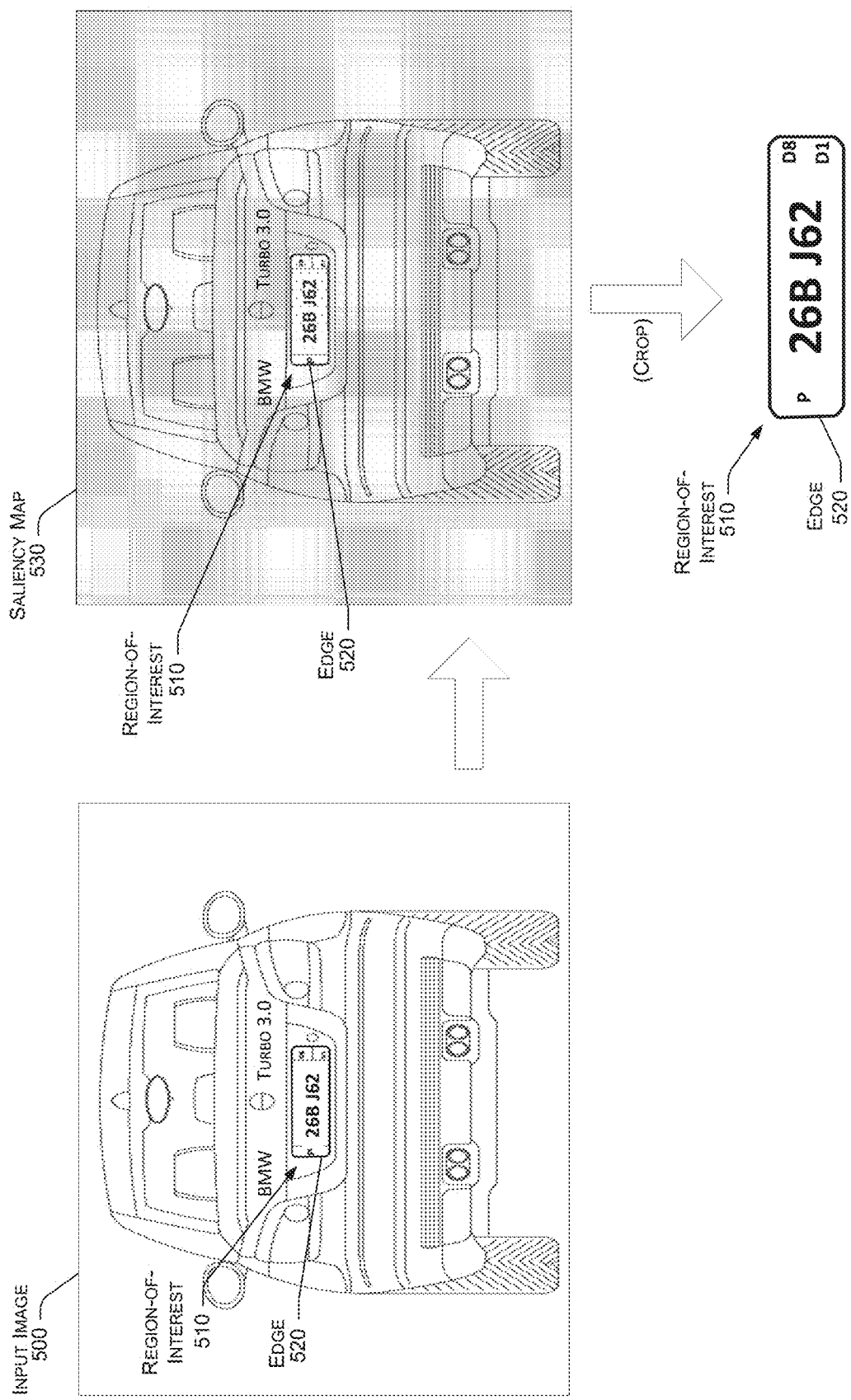
FIG. 5 is an example application of generating the saliency map of a particular still image to identify the region-of-interest in accordance with at least one embodiment.

Example implementations of detecting the regions that include the vehicle license plates are further described in FIGS. 4-5.

Database 182 may store information that supports operations of the NOC 102 as described herein. For example, database 182 may store license plate records, paired patterns for license plate identifications, video streams from patrol units, captured still images using different light wavelengths, associated data measurements, algorithms, vehicle driver record information, vehicles associated with the license plate records, and/or other public records that relate to law enforcement operations. In this example, database 182 may support the pattern identification on the region-of-interest during extreme weather conditions as described herein.

Referring to patrol unit 104, the vehicle camera 112 may include an identification (ID) module (not shown) that identifies the vehicle camera 112 to the NOC 102. The vehicle camera 112 may capture audio and/or video and transmit the captured audio and/or video content to the NOC 102. The vehicle camera 112 may also include at least one sensor (not shown) such as radar, GPS, light sensor, rain/snow/fog sensor, and/or the like, that can be used for monitoring the occurrence of the event. Typically, vehicle camera 112 is in communicative connection with the vehicle computing unit 114. The vehicle computing unit 114 can be a type of computer commonly referred to as a personal computer, or it may be a specialized computer designed to operate within specialized parameters of a law enforcement role. The vehicle computing unit 114 is a part of a computer-assisted dispatch system, similar to those commonly in use by law enforcement agencies, and typically includes an audio/video recording function or a digital video recorder (DVR).

The stationary camera 120 is also shown to be located within the vicinity of patrol unit 104. The stationary camera 120 may include an ID module (not shown) that identifies the stationary camera 120 to the NOC 102. In one example, the stationary camera 120 may capture and stream captured videos to the NOC 102. Further, the stationary camera 120 may also include at least one sensor (not shown) such as radar, GPS, light sensor, rain/snow/fog sensor, and/or the like, that can be used for monitoring the occurrence of the event. Although the stationary camera 120 is shown as mounted on a fixed pole, the stationary camera 120 may be mounted to any other fixed object, such as a building, or it may be mounted to a mobile object.

In one example illustration, the patrol unit 104 pulls over the private vehicle 130 for a detected speed violation, which includes a monitored event that exceeded the corresponding threshold in the event thresholds 174. Further, a deployed rain or snow sensor may detect the presence of heavy rains or snow. In this example, the configurations of the vehicle camera 112 may be adjusted to capture one or more still images of the private vehicle 130 upon the detection of the speeding violation. The one or more still images may be captured using UV light due to the detected weather conditions. The captured still images may be forwarded to the NOC 102 for further processing such as identifications of the paired patterns stored in the database 182. Upon identification of the paired pattern, the corresponding alphanumeric characters, barcode, QR code, and/or associated information of the paired pattern may be retrieved and can be transmitted back to the patrol unit 104.

Example Network Server Environment

Figure 2:
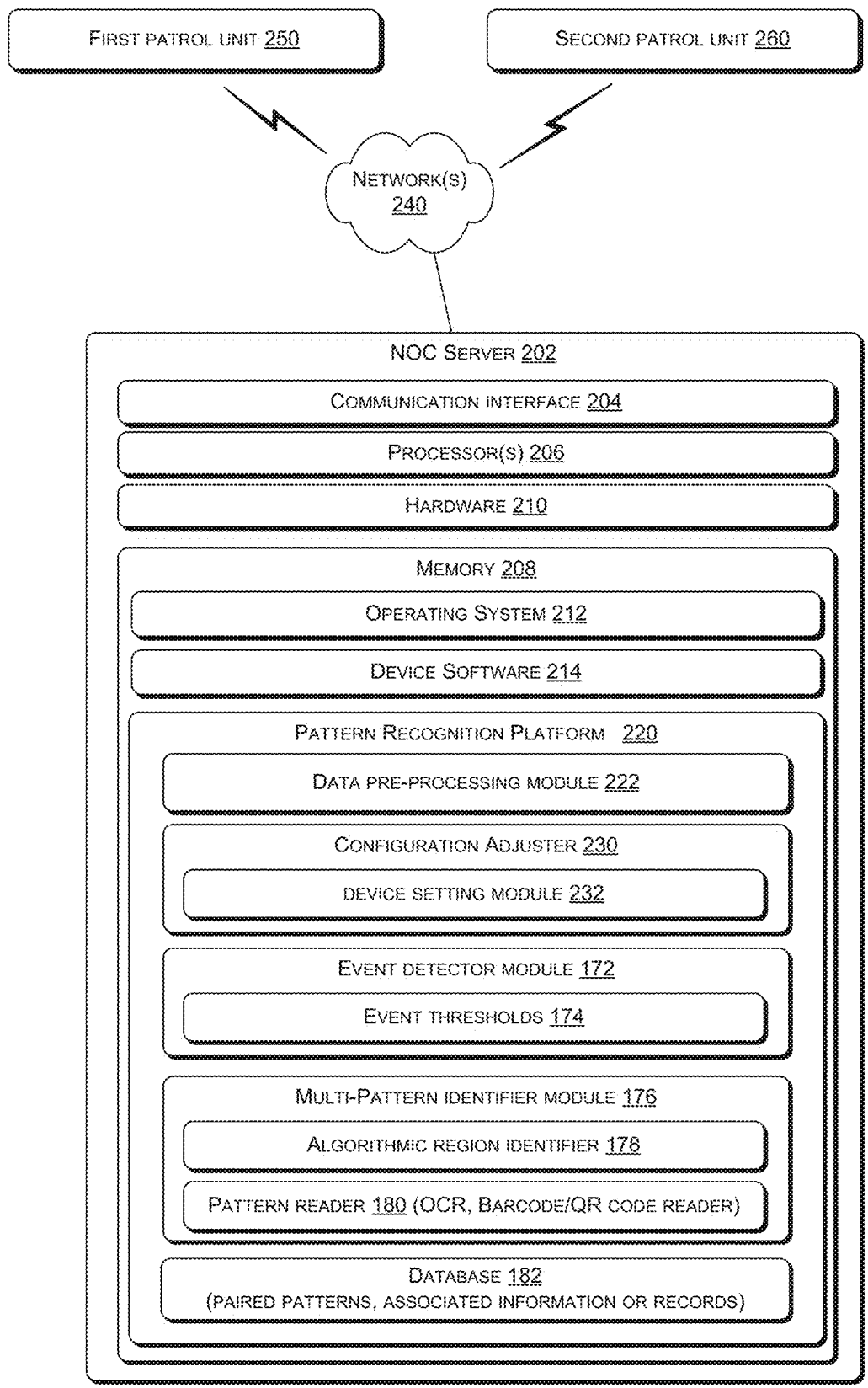
FIG. 2 is a block diagram of an example network server environment that may implement the capturing of still images using different light wavelengths during video streaming in accordance with at least one embodiment.

FIG. 2 is a block diagram of an example network server environment 200 that may implement the capturing of still images using visible lights, UV lights, and/or IR lights during video streaming. The capturing of still images may be triggered by detection of an event such as vehicle speeding, extreme weather conditions, manual request from LEO, or a combination thereof. The one or more still images may be further processed at the NOC for pattern identifications of vehicle license plates, traffic signs, billboards, street advertisements, and/or the like. As shown, the network server environment 200 may include a NOC server 202 that corresponds to the server 164 of FIG. 1. The NOC server 202 may be communicatively connected, via a network 240, to a first patrol unit 250 and a second patrol unit 260 that can employ multiple cameras and sensors for streaming videos and gathering data measurements, respectively. Each of the first patrol unit 250 and the second patrol unit 260 may correspond to the patrol unit 104 of FIG. 1.

The NOC server 202 may include a communication interface 204, one or more processors 206, memory 208, and device hardware 210. The communication interface 204 may include wireless and/or wired communication components that enable the NOC server 202 to transmit or receive voice, audio, and/or data communication via the wireless carrier network, as well as other telecommunication and/or data communication networks. In one example, the communication interface 204 may facilitate receiving of streaming videos from deployed cameras and/or data measurements from one or more sensors in the first patrol unit 250 and the second patrol unit 260. The communication interface 204 may further send adjustments in configurations of the deployed cameras based on the received data measurements as described herein. For example, the deployed cameras may be adjusted to capture still images during video streaming. Further, the deployed cameras may be adjusted to use the UV lights instead of visible lights in capturing still images. In this example, the patterns that may be identified from the captured still images can be used as references to identify the paired patterns, which generally include desired patterns. In one embodiment, the desired patterns may include alphanumeric characters of the vehicle license plate such as the license plate 150 of FIG. 1.

The memory 208 may be implemented using computer-readable media, such as computer storage media. Computer-readable media includes, at least, two types of computer-readable media, namely computer storage media and communications media. Computer storage media includes volatile and non-volatile, removable, and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage, or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The device hardware 210 may include a modem that enables the NOC server 202 to perform data communication with the wireless carrier network. The device hardware 210 may further include signal converters (e.g., a digital-to-analog converter, an analog-to-digital converter), antennas, hardware decoders, and encoders, graphics processors, a universal integrated circuit card (UICC) or an embedded UICC (eUICC), and/or the like, that enable the NOC server 202 to execute applications and provide data communication functions.

The one or more processors 206 and the memory 208 may implement an operating system 212, device software 214, and a pattern recognition platform 220 that corresponds to the pattern recognition platform 170 of FIG. 1. Such software may include routines, program instructions, objects, and/or data structures that are executed by the processors 206 to perform particular tasks or implement particular abstract data types. The one or more processors 206 in conjunction with the pattern recognition platform 220 may further operate and utilize a data pre-processing module 222, a configuration adjuster 230 with a device setting module 232, and other components or modules of the pattern recognition platform 170 as described above in FIG. 1. Particularly, the other components or modules include the event detector module 172 with the event thresholds 174, multi-pattern identifier module 176 with the algorithmic region identifier 178 and pattern reader 180, and the database 182.

The operating system 212 may include components that enable the NOC server to receive and transmit data via various interfaces (e.g., user controls, communication interface 204, and/or memory input/output devices). The operating system 212 may also process data using the one or more processors 206 to generate outputs based on inputs that are received via a user interface. For example, the operating system 212 may provide an execution environment for the execution of the pattern recognition platform 220. The operating system 212 may include a presentation component that presents the output (e.g., displays the data on an electronic display, stores the data in memory, transmits the data to another electronic device, etc.).

The operating system 212 may include an interface layer that enables the pattern recognition platform 220 to interface with the modem and/or the communication interface 204. The interface layer may comprise public APIs, private APIs, or a combination of both public APIs and private APIs. Additionally, the operating system 212 may include other components that perform various other functions generally associated with an operating system. The device software 214 may include software components that enable the network server to perform functions. For example, the device software 214 may include a basic input/output system (BIOS), bootrom, or a bootloader that boots up the NOC server 202 and executes the operating system 212 following power-up of the network device.

The pattern recognition platform 220, when executed, manages the capturing and processing of captured still images to generate the pattern identifications as described herein. The pattern recognition platform 220 may be a single block of executable instructions or it may be made up of several components. The components included in at least one implementation are described below. However, it is noted that in other implementations, more or fewer components may be configured and that one or more operations attributed to a particular component in the following description may be implemented in one or more other components.

The data pre-processing module 222 may process data streams such as streaming videos and data measurements from the deployed cameras and sensors, respectively. One functionality of the data pre-processing module 222 is to verify device identifications of the sources for the streaming video and/or data measurement. For example, the data pre-processing module 222 may identify the particular camera or cameras that streamed a particular video. In another example, data pre-processing module 222 may determine the device identifications of the one or more sensors that detected and transmitted the one or more data measurements. In these examples, the information of the cameras and sensors may be associated with the respective stored video streams and data measurements in the database 182.

The configuration adjuster 230 may facilitate adjustments of the configurations of the deployed cameras and/or sensors. In one example, the adjustment in configurations may include the capturing of one or more still images during video streaming by a particular imaging device or camera, changes in camera settings such as the use of the UV lights or IR lights for capturing the one or more still images, changes in the frequency of taking data measurements by the sensors, and/or the like. In this example, the adjustment in configurations may be triggered by at least one data measurement that exceeds the event threshold. In one instance, a detected presence of heavy snow or above threshold amount of rain may trigger the use of the UV lights by the deployed cameras to capture still images. In this regard, the configuration adjuster 230 may facilitate the adjustment in the configuration of the corresponding imaging device in the first patrol unit 250 and/or the second patrol unit 260.

The configuration adjuster 230 may use the device setting module 232 for adjusting the configurations of the cameras and/or the sensors in the field. The device setting module 232 may store current adjustments of the cameras and/or sensors. Further, the device setting module 232 may include recommended settings of each of the cameras and sensors for capturing still images and performing data measurements, respectively.

In one example, the event detector module 172 may receive the data measurement through the data pre-processing module 222. The data measurements may include an impulse noise, an audio-to-text translation, detected vehicle speed, an alert via manual entry by the LEO, and/or the like. In this example, the event detector module 172 may determine the occurrence of the event by comparing the data measurement with the corresponding threshold in the event thresholds 174. The occurrence of the event may trigger the capturing of still images by the corresponding imaging device. In other instances, the event detector module 172 may further determine the presence of extreme conditions that may affect the capturing of clear still images via the visible lights. In these cases, the presence of extreme conditions may trigger another adjustment in the configurations of the imaging devices to capture the still images using the UV lights.

Upon capturing the still image via the UV lights in the example above, the multi-pattern identifier module 176 may utilize the algorithmic region identifier 178 and the pattern reader 180 to identify the desired pattern on the captured still image. In one example, the algorithmic region identifier 178 may be utilized to isolate the region of the desired pattern to be identified. Given a situation where the vehicle license plates (desired pattern) are to be identified during law enforcement operations, the algorithmic region identifier 178 may use, for example, an edge feature extraction to generate a saliency map of the still image. In this example, the edge feature extraction may generate an output that emphasizes a region-of-interest that includes the vehicle license plates. Thereafter, the region-of-interest may be cropped and the pattern reader 180 may be trained on the cropped region-of-interest to identify the pattern. The pattern reader 180 may include a barcode reader, QR code reader, or OCR algorithm.

In one example, the desired pattern may include the alphanumeric characters, barcodes, QR codes, a similar unique code, or a combination thereof, that can be used to identify the vehicle license plates, road signals, charts, placards, advertisements, or the like, using the visible light. A second pattern that may be paired with the desired pattern may include a copy of the desired pattern itself or a different pattern but constructed with a different material that responds to a different light wavelength such the UV light. In one example, the paired second pattern can be implemented by painting a clear/colorless coating such as a linseed oil finish on the surface of the vehicle license plate, road signal, chart, placard, or the like. The clear coating or ink may generate a deep yellow color when targeted with UV light such that the reflection may be clearly identified from the desired pattern, which can be implemented (painted) using materials that absorb the UV light. In this example, the paired second pattern may be identified using the barcode reader, QR code reader, or via the OCR algorithm.

Upon identification of the paired pattern such as the barcode, QR code, or alphanumeric characters, the database 182 may be searched for the corresponding desired pattern and associated information. For example, the matching desired pattern may include alphanumeric characters of the vehicle license plate while the associated information can include vehicle model, vehicle identification number, or the vehicle registered owner. These alphanumeric characters and associated information may be displayed on a user interface or supplied to the first patrol unit 250 and/or second patrol unit 260, or an agency for further processing.

Example Device

Figure 3:
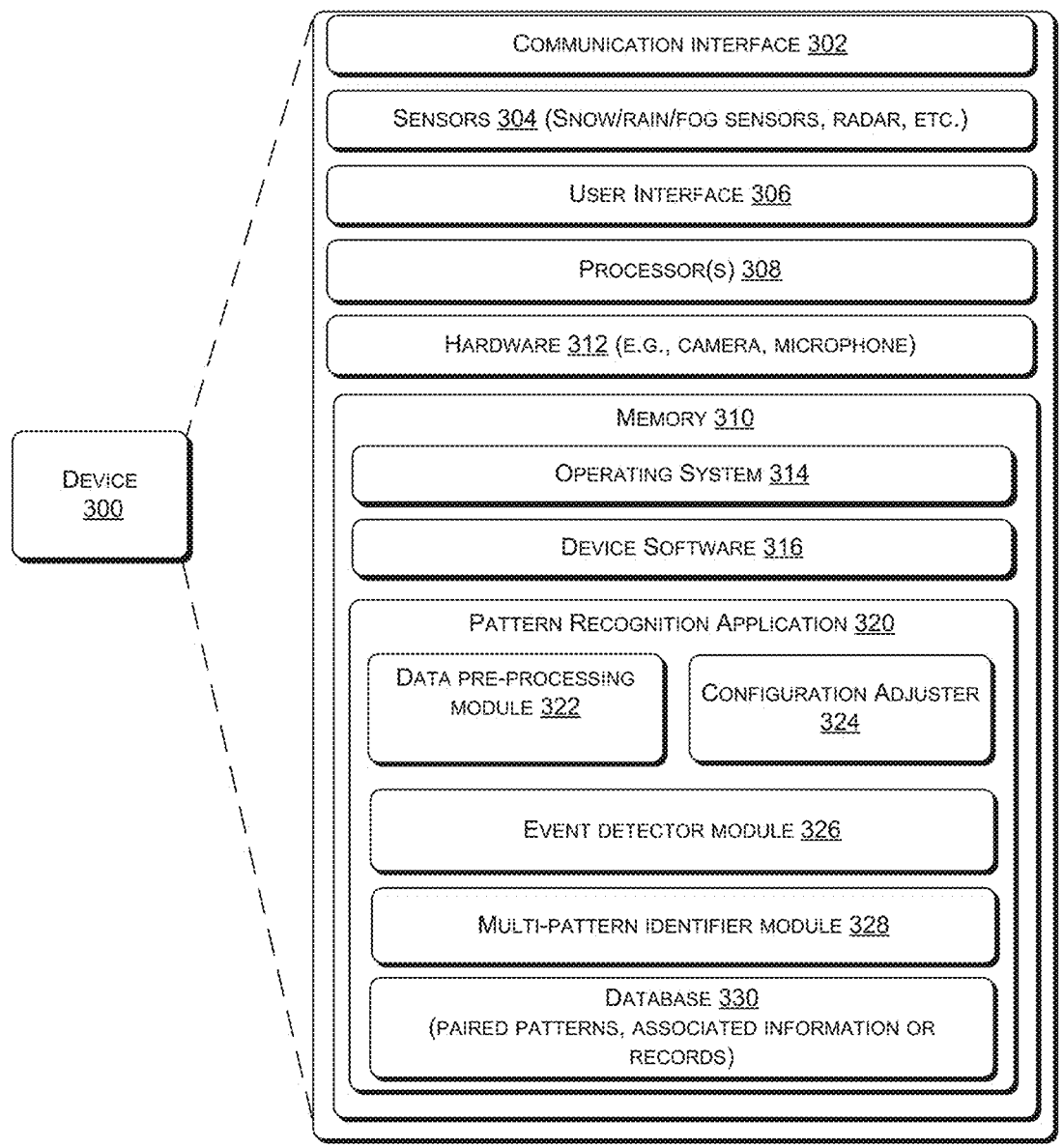
FIG. 3 is a block diagram of an example device that may be used to stream video, capture still images, and/or transmit data measurements to a network operating center (NOC) server in accordance with at least one embodiment.

FIG. 3 is a block diagram showing various components of a device 300 that may be used to stream video, capture still images using different light wavelengths, and/or transmit data measurements to the NOC server such as the NOC server 202 of FIG. 2. In one example, the device 300 may act as a client device that may be remotely managed by the NOC server 202. In this example, the configurations of the device 300 may be controlled by the NOC server 202 to capture still images using UV lights or IR lights for pattern identifications. Alternatively, the device 300 may perform a scaled version of implementing the capturing and processing captured still images for pattern identifications as described in the network server environment 200 of FIG. 2. The scaled version may be limited by the processing capability of the device. In this regard, the device 300 may use the resources of the NOC server 202 and implement the pattern identifications over a larger number of other devices. As described herein, the device 300 may include a camera or other types of an imaging device, a cellular phone, a smartphone, a laptop, a video device, a tablet, a smart device, a wearable device, or any other similar functioning device The device 300 may include a communication interface 302, one or more sensors 304, a user interface 306, one or more processors 308, memory 310, and device hardware 312. The communication interface 302 may include wireless and/or wired communication components that enable the device to stream video, transmit still images, and/or send data measurements that were detected or monitored by the sensors 304. The sensors 304 may include a radar or speed detector, light sensor, audio sensor, GPS, Lidar, gyroscope, thermocouple, motion detector, snow/fog/rain sensors, and/or the like. In one example, the one or more sensors 304 may include Internet-of-Things (IoT) devices that may be positioned outside of the device 300 but communicatively connected at least to the processors 308.

The user interface 306 may enable a subscriber to enter inputs and read outputs. The user interface 306 may include a data output device (e.g., visual display, audio speakers), and one or more data input devices. The data input devices may include but are not limited to, combinations of one or more keypads, keyboards, mouse devices, touch screens, microphones, speech recognition packages, and any other suitable devices or other electronic/software selection methods.

The memory 310 may be implemented using computer-readable media, such as computer storage media. Computer-readable media includes, at least, two types of computer-readable media, namely computer storage media and communications media. Computer storage media includes volatile and non-volatile, removable, and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage, or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The device hardware 312 may include a modem that enables the device 300 to perform data communication with the wireless carrier network. The device hardware 312 may further include signal converters (e.g., a digital-to-analog converter, an analog-to-digital converter), antennas, hardware decoders, and encoders, graphics processors, a universal integrated circuit card (UICC) or an embedded UICC (eUICC), and/or the like, that enable the device 300 to execute applications and provide data communication functions.

The one or more processors 308 and the memory 310 may implement an operating system 314, device software 316, and a pattern recognition application 320. Such software may include routines, program instructions, objects, and/or data structures that are executed by the processors 308 to perform particular tasks or implement particular abstract data types. One or more processors 308 in conjunction with the pattern recognition application 320 may further operate and utilize a data pre-processing module 322, configuration adjuster 324, event detector module 326, multi-pattern identifier module 328, and a database 182. The functions and operations of the operating system 314 and the device software 316 correspond to the functions and operations of the operating system 212 and device software 214 as described in the NOC server 202 of FIG. 2. Further, the functions and operations of the data pre-processing module 322, configuration adjuster 324, event detector module 326, multi-pattern identifier module 328, and database 182 may correspond to the functions and operations of the data pre-processing module 222, configuration adjuster 230, event detector module 172, multi-pattern identifier module 176, and the database 182 of FIG. 2.

In one example, the device 300 may use the hardware 312 for streaming a video of the surrounding area during a patrol operation. The device 300 may similarly use the sensors 304 in obtaining data measurements such as the speed of surrounding vehicles, weather conditions, and so on. In this example, the device 300 may use the data measurements to adjust its configurations for capturing still images. For example, the device 300 may capture a still image using the UV lights when the weather conditions can substantially affect the use of the visible lights. In this example, the device 300 may adjust its configurations to adapt to the detected weather conditions. In some instances, the captured still image may be forwarded to the NOC server for further processing as described in FIG. 2 above.

Example Identification of Region-of-Interest

FIG. 4 is a block diagram 400 showing a pre-processing of the still image to generate a saliency map that can be used to identify the region-on-interest. The saliency map may include an image in which a brightness of a pixel can represent how salient the pixel is. The saliency map may be sometimes referred to as a heat map where hotness refers to the region-of-interest on the still image that has a big impact on predicting a class to which an object belongs to. For example, a still image such as the still image 140 of FIG. 1 may include basic features such as colors and edges that correspond to different light intensities when extracted. In this example, Gaussian pyramid processing may be used on the color features and edge features to generate color feature maps and edge features maps, respectively. Afterward, a mean of these extracted color feature maps and edge feature maps may be calculated to generate the saliency map. The saliency map may highlight the region-of-interest that can be further cropped OCR identification as described below.

In one example, the extracting of the region-of-interest may include zooming out an input image 402 to limit a processing area for the input image 402. The input image 402 may correspond to the still image 140 of FIG. 1. In this example, the input image 402 may include an input color image. After zooming out the input image 402, a color information 404 such as red (R), green (G), and blue (B) color features can be extracted from the input color image. Further, normalized color image 406 such as red (r), green (g), blue (b), and yellow (y) can be calculated and extracted from the color information 404. With the color information 404 and the normalized color image 406, a Gaussian pyramid processing may be adopted to make a blur map and reduce noise influence in a variable scene and size of the region-of-interest (e.g., vehicle license plate).

For example, the Gaussian pyramid processing may generate Gaussian pyramid images 408 that includes an edge 410 and a color opponent 412. In this example, a center surround and different normalization (CSDN) algorithm may be used to extract an edge feature 414 and a color feature 416 from the edge 410 and the color opponent 412, respectively. An edge feature map 418 and a color feature map 420 may be also generated from the edge feature 414 and color feature 416, respectively. By using respective weight factors for color feature map 420 and edge feature map 418, a saliency map 422 of the still image including the region-of-interest can be generated.

With the obtained saliency map 422, the region-of-interest such as a vehicle license plate 150 of the still image 140 in FIG. 1 may be down-sampled and cropped to remove the background of the still image that is outside of the region-of-interest. Thereafter, the pattern reader such as the pattern reader 180 of FIG. 2 may be trained to the cropped region-of-interest to identify the desired patterns of the vehicle license plate, traffic signs, and/or the like.

Example Identification of Vehicle License Plate

FIG. 5 is an example application of generating the saliency map of a particular image to identify the region-of-interest. FIG. 5 illustrates an input image 500 including a region-of-interest 510 and an edge 520 that corresponds to a contour or shape of the region-of-interest 510. FIG. 5 also shows a saliency map 530 that may be generated after the processing of the input image 500. In one example, the pattern recognition platform may first zoom out the input image 500 to limit the processing area. The color information and the normalized color image of the input image 500 may be subsequently extracted for further Gaussian pyramid and CSDN processing to produce the respective edge feature map and color feature map as described in FIG. 4. Based on a weighted sum of the edge feature map and the color feature map, the saliency map 530 of the input image 500 can be generated.

In an example embodiment, the region-of-interest 510 may be cropped such that the rest of the background can be removed from the saliency map 530. With the removed background, only the patterns that are within the region-of-interest 510 may be identified via, for example, the use of the multi-pattern identifier module such as the multi-pattern identifier module 176 of FIG. 2. In some cases, the standard number of characters in the vehicle license plate (e.g., three letters and three numbers) may be used as another event threshold to re-adjust the configuration of the camera to capture another set of one or more still images using the UV lights or IR lights. For example, the application of the OCR on the captured still image based on the visible light identifies a number of characters that is less than the total number of characters in the standard vehicle license plate. Here, the total number of characters can be used as a threshold. In this example, the pattern recognition platform may prompt the imaging device to capture another set of one or more still images using the UV lights and the captured still images are similarly processed as described in the steps above. In other instances, the detected surrounding conditions such as heavy snow, rain, or fog may trigger the capturing of the still image using the UV lights. In these cases, the patterns on the region of interest 510 may be identified using the pattern reader such as the pattern reader 180 of FIG. 2.

Example Pattern Identifications

Figure 6:
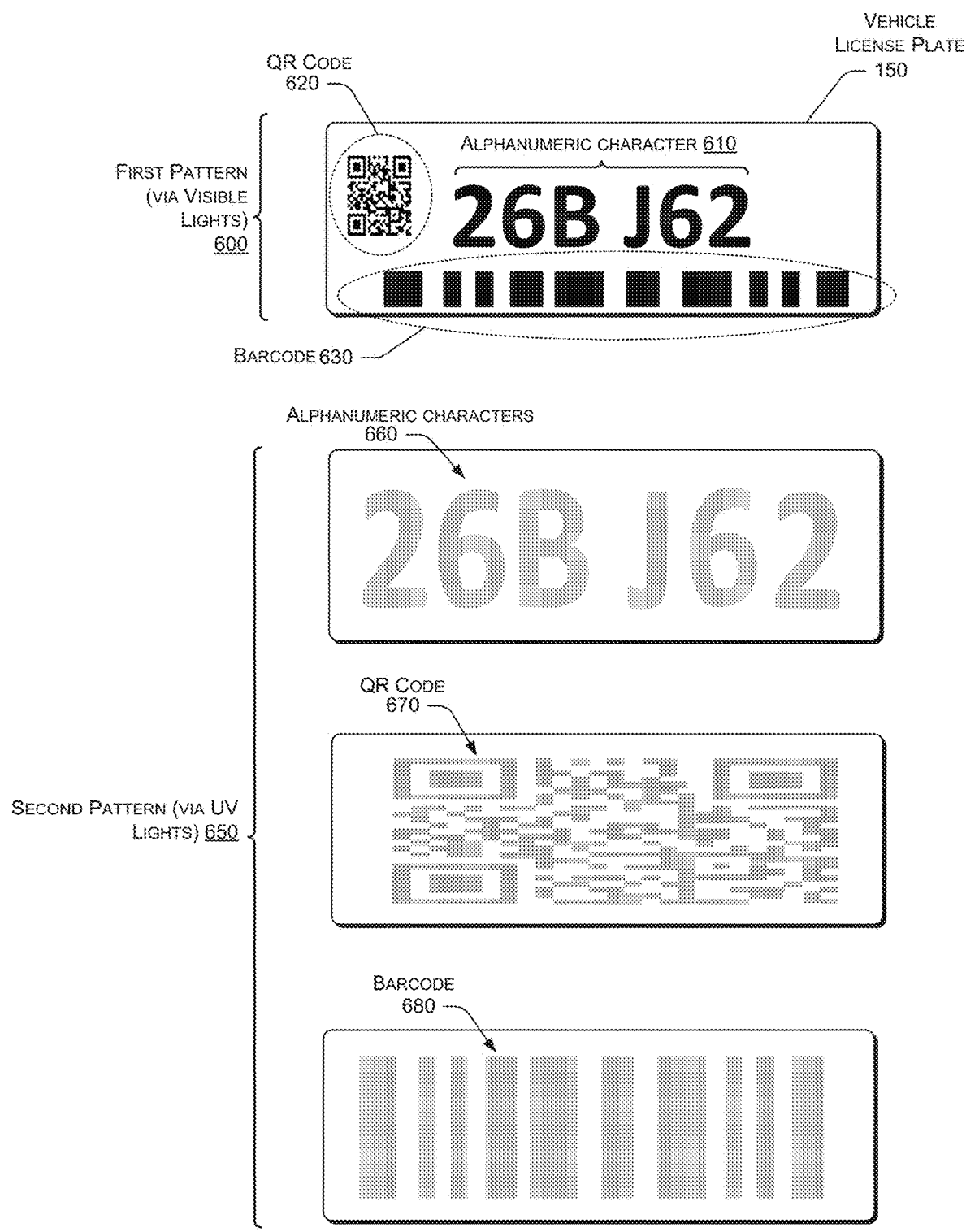
FIG. 6 is an example implementation of using one or more patterns to identify a desired pattern such as a pattern on a vehicle license plate during law enforcement operations in accordance with at least one embodiment.

FIG. 6 is an example implementation of using one or more patterns to identify a desired pattern such as patterns on the vehicle license plates during law enforcement operations. FIG. 6 shows a first pattern 600 and a second pattern 650 that can be captured using the visible light and UV light, respectively. The first pattern 600 may include string of alphanumeric characters 610, QR code 620 and a barcode 630 while the second pattern 650 may include alphanumeric characters 660, QR code 670, and a barcode 680. Each of the alphanumeric characters 660, QR code 670, and the barcode 680 of the second pattern 650 may be configured as a pair of the first pattern 600 for purposes of identifying the alphanumeric characters 610 in the vehicle license plate 150. Further, a combination of one or more of the alphanumeric characters 660, QR code 670, and the barcode 680 of the second pattern 650 may be used to identify the alphanumeric characters 610 in the vehicle license plate 150.

In one example, the QR code 620 and the barcode 630 of the first pattern 600 may be printed on portions of a plastic or aluminum vehicle license plate 150 that do not overlap with the printed alphanumeric characters 610. The QR code 620 and the barcode 630 may be associated with the alphanumeric characters 610 such that the identification of the QR code 620 or the barcode 630 alone may be used as a reference to determine the corresponding alphanumeric characters 610. In this example, alphanumeric characters 610, QR code 620, and the barcode 630 may be printed using ink that can absorb the UV lights. An example ink may include zinc oxide, zinc sulfide, carbon black, or red iron oxide that can be effective absorbers of UV lights. In this example, when the UV lights are used to identify the second pattern 650, the first pattern 600 may be clearly distinguished from the second pattern 650 because the first pattern 600 absorbs the UV lights while the second pattern 650 reacts to the UV lights that can be used for capturing the still images.

Referring to the second pattern 650, each of the alphanumeric characters 660, QR code 670, and the barcode 680 may be painted using a colorless or clear coating such as the linseed oil finish that can generate a deep yellow color when targeted with UV light. In one example, the reflections from the clear coating may be clearly distinguished from the first pattern 600 due to reflective nature of the linseed oil finish and the UV absorbing characteristics of the paint used to print the first pattern 600. In this example, the paired alphanumeric characters 660, QR code 670, or the barcode 680 may be identified using an OCR algorithm, barcode reader, or a QR code reader, respectively. In one embodiment, the clear coating/ink may further make the first pattern 600 easier to capture, for example, with sufficient fidelity (e.g., higher resolution, higher image area, better defined edges, better contrast, additional code components) such that conventional OCR techniques have an improved rate of success when processing the captured image. Further, the second pattern 650 that may be identified in the captured image (or second media) may be present in the video stream (or first media). This pattern maybe subjected to an OCR process to determine the string of alphanumeric characters 610 (e.g., actual license plate number), and an accuracy of the OCR process is increased based in part on the use of the second range of wavelengths as described herein. Upon identification of the alphanumeric characters 660, QR code 670, or the barcode 680, the NOC server 202 may retrieve from the database 182 the paired first pattern 600 and particularly the alphanumeric characters 610. As described herein, other colorless materials that react to UV lights may be utilized without affecting the described embodiments.

Example Implementation—Capturing Region-of-Interest

Figure 7:
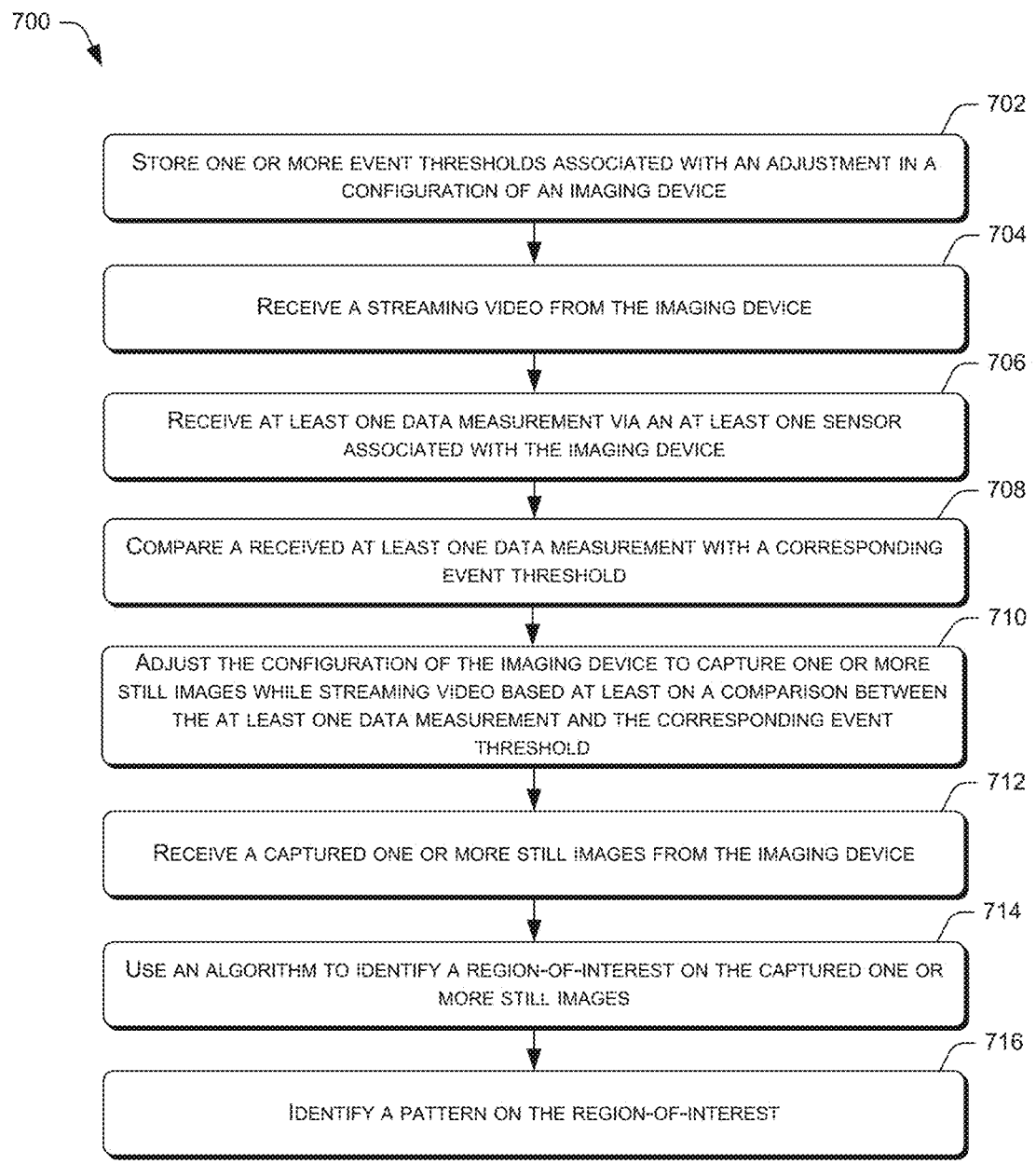
FIG. 7 is a flow diagram of an example methodological implementation for capturing the region-of-interest on still images in accordance with at least one embodiment.

FIG. 7 is a flow diagram 700 that depicts a methodological implementation of at least one aspect of the techniques for capturing the region-of-interest on the one or more still images. In the following discussion of FIG. 7, continuing reference is made to the elements and reference numerals shown in and described with respect to the NOC server 202 of FIG. 2. Further, certain operations may be ascribed to particular system elements shown in previous figures. However, alternative implementations may execute certain operations in conjunction with or wholly within a different element or component of the system(s). Furthermore, to the extent that certain operations are described in a particular order, it is noted that some operations may be implemented in a different order to produce similar results.

At block 702, the NOC server 202 may store one or more event thresholds associated with an adjustment in a configuration of an imaging device. In one example, the one or more event thresholds may include at least one of vehicle speed thresholds, a text similarity threshold, a light intensity threshold, a number of characters in a standard vehicle license plate threshold, thresholds for snow/rain/fog weather conditions, and/or the like.

At block 704, the NOC server 202 may receive a streaming video from the imaging device. For example, the vehicle camera 112 of the patrol unit 104 may continuously stream videos of the road, other vehicles, traffic signs, and/or the like, during patrol operations by the patrol unit 104.

At block 706, the NOC server 202 may receive least one data measurement via at least one sensor associated with the imaging device. For example, patrol unit 104 may install radar, lidar, light sensor, GPS, and/or other sensors. In this example, the at least one data measurement may include vehicle speed measurement, audio-to-text translation, an impulse noise, or a revolving high-intensity light measurement at a fixed frequency.

At block 708, the NOC server 202 may compare a received at least one data measurement with a corresponding event threshold. For example, the corresponding threshold may include at least one of the vehicle speed thresholds, a text similarity threshold, an impulse sound wave threshold, or a light intensity threshold.

At block 710, the NOC server 202 may facilitate adjustments in the configuration of the imaging device to capture one or more still images while streaming video based at least on a comparison between the at least one data measurement and the corresponding event threshold. For example, the configuration of the imaging device may be adjusted when the detected vehicle speed measurement is zero or above the vehicle speed threshold, the audio-to-text translation exceeds the text-similarity threshold, the impulse noise is above the impulse sound wave threshold, or the revolving high-intensity light measurement at the fixed frequency is greater than the light intensity threshold. In another example, the configuration of the imaging device may be adjusted to use the UV lights or IR lights when extreme weather conditions such as heavy rains, snow, or fog are detected.

At block 712, the NOC server 202 may receive a captured one or more still images from the imaging device. In one example, the captured one or more still images may be taken using the UV lights.

At block 714, the NOC server 202 may use an algorithm to identify a region-of-interest on the captured one or more still images. For example, the NOC server 202 may generate a saliency map of a particular still image. In this example, the saliency map may be used to identify the region-of-interest such as the vehicle license plate on the still image.

At block 716, the NOC server 202 may identify a pattern on the region-of-interest. For example, the NOC server 202 may use a pattern reader that can read the alphanumeric characters, barcode or QR code on the vehicle license plate. In this example, the alphanumeric characters, barcode, or the QR code may be used as a reference to identify the paired vehicle license plate and associated information from the database.

Example Implementation—Identifying Patterns on Vehicle License Plates

Figure 8:
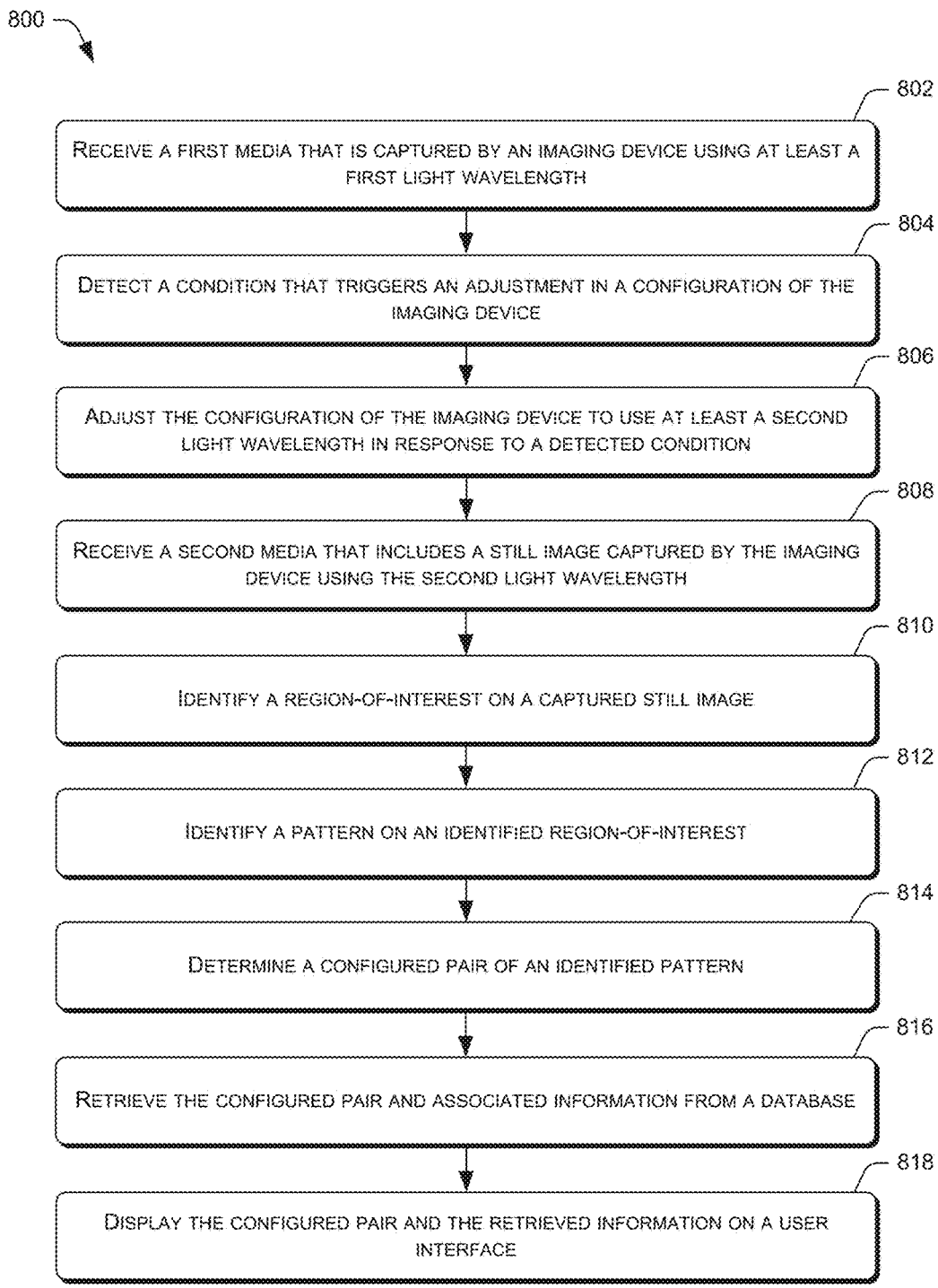
FIG. 8 is a flow diagram of an example methodological implementation for identifying patterns on vehicle license plates in accordance with at least one embodiment.

FIG. 8 is a flow diagram 800 that depicts a methodological implementation of at least one aspect of the techniques for identifying patterns on vehicle license plates. In the following discussion of FIG. 8, continuing reference is made to the elements and reference numerals shown in and described with respect to the NOC server 202 of FIG. 2. Further, certain operations may be ascribed to particular system elements shown in previous figures. However, alternative implementations may execute certain operations in conjunction with or wholly within a different element or component of the system(s). Furthermore, to the extent that certain operations are described in a particular order, it is noted that some operations may be implemented in a different order to produce similar results.

At block 802, the NOC server 202 may receive a first media that can be captured by an imaging device using at least a first light wavelength. For example, the first media may include video streams or uploaded videos from the imaging device. In this example, the imaging device may use the range of visible light wavelengths as a first range of light wavelengths for capturing the first media.

At block 804, the NOC server 202 may detect a condition that triggers an adjustment in a configuration of the imaging device. For example, the NOC server 202 may receive a data measurement that indicates the presence of heavy rain, snow, fog, or the like, which affects the use of visible light in capturing clear still images. The data measurement may be taken by a rain sensor, snow or fog sensor, or the like, and compared to a corresponding threshold stored in the event thresholds 174. Alternatively, or additionally, the NOC server 202 may receive a data measurement that indicates an occurrence of an event that can trigger the capturing of the still images. In this example, the NOC server 202 may facilitate adjustments in the configuration of the imaging device to capture the still images using a different light wavelength.

At block 806, the NOC server 202 may adjust the configuration of the imaging device to use at least a second light wavelength in response to a detected condition. For example, the second light wavelength or second range of light wavelengths includes the UV light wavelengths. Alternatively, the second range of light wavelengths includes IR light wavelengths. In at least one embodiment, the second range of light wavelengths is disjoint from the first range of light wavelengths, but this condition need not hold in some embodiments. As described herein, the detected condition may also be referred to as a detected event.

At block 808, the NOC server 202 may receive a second media that includes a still image that can be captured by the imaging device using the second light wavelength. For the example, the second media may include the still image that can be captured using the second range of light wavelengths such as the UV light wavelengths or IR light wavelengths.

At block 810, the NOC server 202 may identify the region-of-interest on a captured still image. For example, the NOC server 202 may use an algorithmic plate number identification that can calculate the edge feature map and the color feature map of the still image. For example, the still image such as the still image 140 of FIG. 1 may include basic features such as colors and edges that correspond to different light intensities when extracted. In this example, Gaussian pyramid processing may be used on the color features and edge features to generate color feature maps and edge features maps, respectively. Afterward, a mean of these extracted color feature maps and edge feature maps may be calculated to generate the saliency map. The saliency map may highlight the region-of-interest that can be further cropped to remove the background of the still image that is outside the edges of the region-of-interest. In one example, pixel brightness of the edges of the region-of-interest can be used to identify the background from the foreground. In this example, the foreground may include the vehicle license plate, traffic signs, and/or the like.

At block 812, the NOC server 202 may identify a pattern on an identified region-of-interest. For example, the pattern includes the second pattern 650 as described in FIG. 6. In this example, the identification of alphanumeric characters 660, QR code 670, or the barcode 680 may facilitate retrieval of the paired pattern such as the first pattern 600 in FIG. 6.

At block 814, the NOC server 202 may determine a configured pair of an identified pattern. For example, the identified pattern may include one of the alphanumeric characters 660, QR code 670, or the barcode 680 in FIG. 6. In this example, the configured pair may include the alphanumeric characters 610 of the first pattern 600 in FIG. 6.

At block 816, the NOC server 202 may retrieve the configured pair and associated information from the database. For example, the configured pair includes the alphanumeric characters 610 of the license plate 150 while the associated information may include the registered owner of the license plate 150, vehicle identification, and/or the like.

At block 818, the NOC server 202 may display the configured pair and the associated information on a user interface of a requesting device. For example, the NOC server 202 may provide presentation information based at least in part on the identified pattern. In this example, the providing of the presentation information may include the displaying of the retrieved configured pair and associated information that correspond to the identified pattern.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method, comprising:
receiving, by a server, a streaming video captured by an imaging device using at least a first light wavelength;
detecting in the streaming video, by the server, a condition that triggers an adjustment in a configuration of the imaging device based on a comparison of data measurements indicating co-occurring events including a vehicle speed violation and a revolving high-intensity light detection to corresponding event thresholds;
in response to the trigger, adjusting the configuration of the imaging device to capture a still image using at least a second light wavelength while the streaming video is captured using at least the first light wavelength, wherein:
in response to determining the first light wavelength is a visible light wavelength, using a non-visible light wavelength as the second light wavelength;
in response to determining the first light wavelength is a non-visible light wavelength, using a visible light wavelength as the second light wavelength;
receiving the still image that is captured by the imaging device using at least the second light wavelength;
identifying a region-of-interest on the captured still image;
identifying a second pattern in the identified region-of-interest;
using the second pattern, retrieving a configured pair of the second pattern and a first pattern and associated information from a database; and
displaying the configured pair and associated information on a user interface.

2. The computer-implemented method of claim 1, wherein the second light wavelength includes an Ultra-Violet (UV) light wavelength.

3. The computer-implemented method of claim 1, wherein the identifying the second pattern includes reading of a barcode or a Quick Response (QR) code.

4. The computer-implemented method of claim 3, wherein the barcode or the QR code is printed using a clear ink on a surface of a license plate.

5. The computer-implemented method of claim 4, wherein the clear ink receives an Ultra-Violet (UV) light wavelength and generates a visible light wavelength in response to the received UV light wavelength.

6. The computer-implemented method of claim 4, wherein the clear ink is printed as a clear coating and overlapping with alphanumeric characters on the license plate.

7. The computer-implemented method of claim 1, wherein the condition that triggers the adjustment includes a weather condition that generates an opaque visibility at the first light wavelength.

8. The computer-implemented method of claim 1, further comprising:
   storing an alphanumeric character of a vehicle license plate and a corresponding barcode or QR code as the second pattern that is used as a reference to determine the alphanumeric character of the vehicle license plate as the first pattern.

9. A network server, comprising:
   one or more processors; and
   memory including a plurality of computer-executable components that are executable with the one or more processors to perform a plurality of actions, the plurality of actions comprising:
      receiving a first media captured by an imaging device using a first range of light wavelengths, wherein the first range of light wavelengths is one of a range of visible light wavelengths or a range of non-visible light wavelengths;
      detecting, in the first media, a condition that triggers an adjustment in a configuration of the imaging device based on a comparison of data measurements indicating co-occurring events including a vehicle speed violation and a revolving high-intensity light detection to corresponding event thresholds;
      in response to the trigger, adjusting the configuration of the imaging device to capture a second media using a second range of light wavelengths while the first media is captured using the first range of light wavelengths, wherein:
         in response to determining the first range of light wavelengths includes a visible light wavelength, using a non-visible light wavelength range as the second range of light wavelengths;
         in response to determining the first range of light wavelengths includes a non-visible light wavelength, using a visible light wavelength range as the second range of light wavelengths;
      receiving the second media that is captured by the imaging device using the second range of light wavelengths;
      identifying a second pattern in the received second media;
      using the second pattern, retrieving a configured pair of the second pattern and a first pattern and associated information from a database; and
      displaying the configured pair and associated information on a user interface.

10. The network server of claim 9, wherein the second range of light wavelengths includes an Ultra-Violet (UV) light wavelength.

11. The network server of claim 9, wherein the identifying the second pattern includes reading of a barcode or a Quick Response (QR) code.

12. The network server of claim 11, wherein the barcode or the QR code is printed using a clear ink on a surface of a license plate.

13. The network server of claim 12, wherein the clear ink receives an Ultra-Violet (UV) light wavelength and generates a visible light wavelength in response to a received UV light wavelength.

14. The network server of claim 12, wherein the clear ink is printed as a clear coating and overlapping with alphanumeric characters on the license plate.

15. One or more non-transitory computer-readable storage media storing computer-executable instructions that upon execution cause one or more computers to collectively perform acts comprising:
   receiving a first media captured by an imaging device using a first range of wavelengths, wherein the first range of light wavelengths is one of a range of visible light wavelengths or a range of non-visible light wavelengths;
   detecting, in the first media, a condition that triggers an adjustment in a configuration of the imaging device based on a comparison of data measurements indicating co-occurring events including a vehicle speed violation and a revolving high-intensity light detection to corresponding event thresholds;
   in response to the trigger, adjusting the configuration of the imaging device to capture a second media using a second range of wavelengths while the first media is captured using at least the first range of light wavelengths, wherein:
      in response to determining the first range of light wavelengths includes a visible light wavelength, using a non-visible light wavelength range as the second range of light wavelengths;
      in response to determining the first range of light wavelengths includes a non-visible light wavelength, using a visible light wavelength range as the second range of light wavelengths;
   receiving the second media that is captured by the imaging device using the second range of wavelengths;
   identifying a second pattern in the second media;
   using the second pattern, retrieving a configured pair of the second pattern and a first pattern and associated information from a database; and
   displaying the configured pair and associated information on a user interface.

16. The one or more non-transitory computer-readable storage media of claim 15, wherein the pattern identified in the second media is present in the first media, the pattern is subject to an optical character recognition (OCR) process to determine a string of alphanumeric characters, and an accuracy of the OCR process is increased based in part on the use of the second range of wavelengths.

17. The one or more non-transitory computer-readable storage media of claim 16, wherein the determined string of alphanumeric characters corresponds to a license plate number.

18. The computer-implemented method of claim 1, further comprising: generating a saliency map of the still image comprising the identified region-of-interest.

19. The network server of claim 9, wherein the plurality of actions further comprise:
   identifying a region-of-interest on the captured second media; and generating a saliency map of the still image comprising the identified region-of-interest.

20. The computer-implemented method of claim 18, wherein the saliency map is generated using edge feature extraction.

* * * * *